Jan. 26, 1965 H. A. ZAGORITES ETAL 3,167,777

RECORDING AND REPRODUCING SYSTEM

Filed March 16, 1962 2 Sheets-Sheet 1

INVENTORS
HARRY A. ZAGORITES
MARCO I. LIPANOVICH
LAURENCE A. PERRINE
BY
ATTORNEYS

RECORDING AND REPRODUCING SYSTEM

Filed March 16, 1962 2 Sheets-Sheet 2

INVENTORS
HARRY A. ZAGORITES
MARCO I. LIPANOVICH
LAURENCE A. PERRINE
BY
ATTORNEYS

United States Patent Office 3,167,777

Patented Jan. 26, 1965

3,167,777

RECORDING AND REPRODUCING SYSTEM

Harry A. Zagorites, 82 Montana St., San Francisco, Calif.; Marko I. Lipanovich, 514 Distel Drive, Los Altos, Calif.; and Laurence A. Perrine, 520 San Mateo Ave., Pacific, Calif.

Filed Mar. 16, 1962, Ser. No. 180,373
4 Claims. (Cl. 346—74)
(Granted under Title 35, U.S. Code (1952), sec. 266)

The invention described herein may be manufactured and used by or for the Government of the United States of America for governmental purposes without the payment of any royalties thereon or therefor.

The present system pertains to a multichannel recording and playback system and more particularly to a system employing incremental recording apparatus.

Present methods of recording utilize techniques of transporting recording media at rates independent of input signal rates. If data and timing signals are both recorded on a recording media, it is inherent that the media will continue to move between data and time signals as the transport rate is independent of the input signal rate. When serial events of random sequence are recorded by present methods, optimum data density and minimum record length cannot be achieved. Furthermore, since the transport of recording media continues betwen input signals, driving power is consumed when no data are being recorded.

In accordance with the present invention there is provided a recording medium, an increamental driving means, multichannel writing means, and playback means. The incremental driving means transports the recording medium in increments of constant length which is optimum for the resolution of the writer and the medium combination. The drive mechanism is common to all input channels and advances the medium in accordance with the rate of the input signals. The input signals are recorded on the medium by the writing means and reproduced at will by the playback means.

It is an object of the present invention to provide apparatus for incremental stepping of a multichannel recording medium with the stepping rate made dependent upon the input signal rate being received.

It is an object of the present invention to provide recording apparatus which will enable length compression of the recording medium.

It is still another object of the invention to provide recording apparatus having a power consumption rate directly proportional to the input signal repetition rate.

It is a concomitant advantage of the present invention that a longer recording time capability for a given medium length is achieved and the readout time is reduced.

Other objects and advantages of the invention will be apparent from a study of the following specifications, read in connection with the accompanying drawings, wherein.

Figure 1:
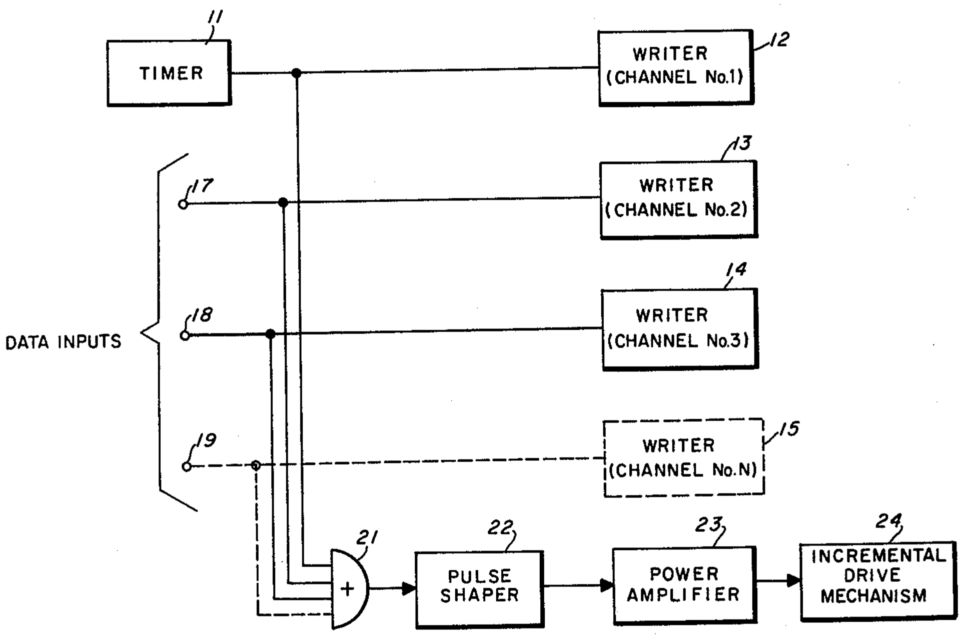
FIG. 1 is a block diagram illustrating an incremental recording system in accordance with the present invention.

The apparatus shown in FIG. 1 is equipped with a timer 11 which continuously emits signals at equal time intervals. The timer may be a pulse generator that emits pulses at a fixed repetition rate. The output of the timer is coupled to writer 12 which writes the timing signals on a recording medium, not shown. Data pulse trains imposed on input terminals 17–19 are transferred to the same recording medium by means of writers 13–15, respectively. It should be appreciated that either more or less data channels may be provided. The data trains imposed on the inputs may be, for example, the pulse counts from nuclear radiation detectors. The output of timer 11 and all the signals imposed on inputs 17–19 are fed into OR gate circuit 21. Assuming the inputs to OR gate 21 are A, B, C and N and the output is $f$, the function of the gate is expressed by this logic equation:

$$f=A+B+C+N$$

Suitable OR gate circuits are shown in the General Electric Transistor Manual, Fifth Edition, 1960, Chapter 12. Output pulses from OR gate 21 are shaped in pulse shaper 22 and amplified in power amplifier 23. The amplified pulses energize an incremental drive mechanism which causes the recording medium to move with respect to the writers. Each pulse from amplifier 23 causes a one-step displacement between the recording medium and the writers. Pulses entering the data channel coincidently are written on the recording medium by the respective channel writers, but only a one-step displacement occurs between the recording medium and the writers for all of the coincident pulses. The channel which experiences the highest signal incidence usually has control of the displacement between the recording medium and writers. When no signals enter OR gate 21 there is no displacement between the recording medium and the writers and drive power is conserved. The recurrent time signals periodically cause a one-step displacement between the recording medium and the writers, and are simultaneously written on Channel No. 1 of the recording medium.

Figure 2:
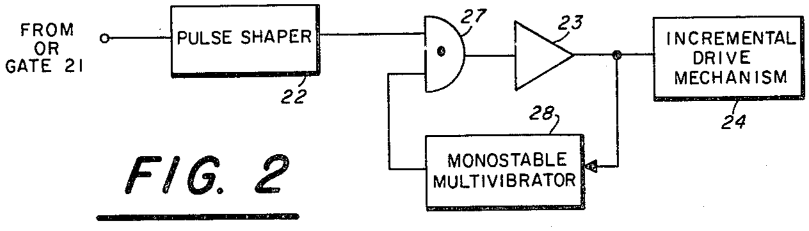
FIG. 2 illustrates a modified drive mechanism circuit.

FIG. 2 illustrates modified drive mechanism circuitry which may be employed to lessen drive mechanism indexing ambiguity when drive pulses are closely spaced. The output of pulse shaper 22 is fed to one input of two-input And gate 27 and the output of monostable one-shot multivibrator 28 is fed to the other input. An And gate is a circuit that functions in accordance with the logic equation $f=A\cdot B\cdot C$ wherein $f$ is the output and A, B and C are the inputs. Suitable And gates are shown in the General Electric Transistor Manual, Fifth Edition, 1960, chapter 12. The output of power amplifier 23 is fed to the input of multivibrator 28. In its stable state, multivibrator 28 produces a "1" output signal. Thus, when a "1" pulse enters And gate 27 from pulse shaper 22, a "1" pulse is produced at the output of the gate. This output pulse is amplified by amplifier 23 before it causes mechanism 24 to index one increment. The trailing edge of the pulse from And gate 27 toggles multivibrator 28 from its stable to unstable state for a fixed period of time depending on the time constant of the coupling circuit between the active elements in the multivibrator. While in its unstable state, multivibrator 28 produces a "0" output signal and prevents "1" pulses from being produced at the output of And gate 27. Therefore, during this period, mechanism 24 can not be re-indexed, but all pulses in the writing channels are still recorded.

Figure 3:
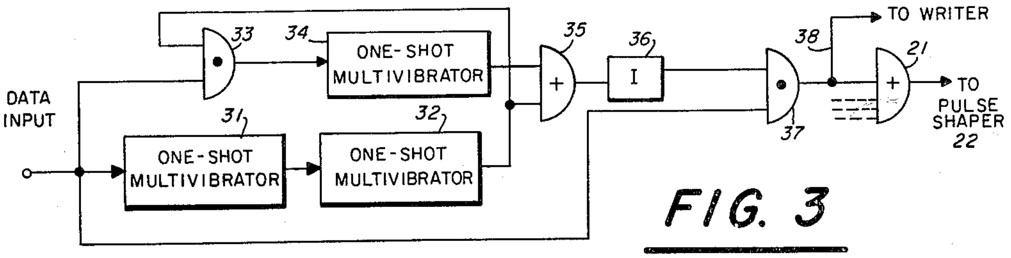
FIG. 3 is a block diagram of apparatus for cutting off the incremental drive mechanism.

If the maximum indexing rate of the incremental drive mechanism is exceeded the recorded data will be unreliable. FIG. 3 illustrates a block diagram of suitable protective apparatus that may be interposed between an input terminal (such as 17, 18 or 19) and Or gate 21 when it is known or predicted that the input data rate will exceed the maximum reliable indexing rate of the incremental drive mechanism. Referring to FIG. 3, the input of a one-shot multivibrator 31, one input of a two-input And gate 37 and one input of a two-input And gate 33 are all connected to the data input terminal (terminal 17 or 18 or so forth). One-shot multivibrator 31 produces a "1" pulse in its unstable condition when switched by a data pulse. The "1" output pulse has a pulse width corresponding to the width of data pulses. If the data pulses are not shaped before being applied to the data input terminal, one-shot multivibrator 31 should preferably be replaced with a Schmitt trigger (not shown) which produces a "1" output pulse in response to an incoming data pulse. The output of one-shot multivibrator 31 is connected to the input of a one-shot multivibrator 32. Multivibrator 32 becomes unstable and produces a "1" output pulse when multivibrator 31 switches to its stable conditions. In short, the trailing edge of the "1" pulse from multivibrator 31 fires multivibrator 32. The output of multivibrator 32 is connected to the other input of And gate 33 and one input of Or gate 35. The output of And gate 33 is connected to the input of a one-shot multivibrator 34. A "1" pulse from And gate 33 causes one-shot multivibrator 34 to switch to its unstable state and the output signal from multivibrator 34 is a "1" pulse during the unstable period.

The output of multivibrator 34 is connected to the other input of two-input Or gate 35. An inverter 36 is coupled between the output of Or gate 35 and the other input of two-input And gate 37. The writer for the particular channel is connected to the output of And gate 37 by means of connection 38. The output of And gate 37 is also connected to one input of Or gate 21.

In operation, all data pulses applied to the data input terminals can reach the associated channel writer and incremental drive mechanism 24 only if they "pass" through And gate 37. Assuming data pulses to be "1" pulses, when the primordial data pulse is applied to the data input terminal it creates a "1" pulse at the output of And gate 37 as the output of inverter 36 is a "1" pulse. The data pulse causes multivibrator 31 to switch to the unstable state and when the multivibrator switches back it fires multivibrator 32. The output signals of multivibrator 32 and Or gate 35 become "1" pulses and the output signal of inverter 36 becomes a "0" pulse. Thus, And gate 37 is closed immediately after the data pulse passes through. And gate 37 can not pass another "1" pulse (a data pulse) until multivibrator 32 returns to its normal stable state and produces a "0" output pulse.

When the primordial pulse enters one input of And gate 33, the signal at the second input is a "0" pulse and the output of And gate 33 remains at the "0" level. However, if a subsequent data pulse enters And gate 33 when multivibrator 32 is in its unstable state, a "1" pulse is produced at the output of And gate 33 because both input signals are "1" pulses. The "1" output pulse from multivibrator 33 causes multivibrator 34 to switch to its unstable state and produce a "1" output pulse. This "1" output pulse causes a "0" pulse to appear at the output of inverter 36 and the "0" pulse keeps And gate 37 closed for the duration of the one-shot pulse from multivibrator 34. The one-shot pulse from multivibrator 34 further insures that the writer and incremental drive mechanism will not be energized by data pulses exceeding the maximum reliable indexing rate.

The sum of the one-shot periods of multivibrators 31 and 32 is preferably equal to the reciprocal of the maximum indexing rate of the incremental drive mechanism. The one-shot period of multivibrator 34 is preferably greater than the sum of the one-shot periods of multivibrators 31 and 32. For example, if the data pulses are one millisecond and the maximum indexing rate is 100 pulses per second, the one-shot periods of multivibrators 31, 32 and 34 may be 1 millisecond, nine milliseconds and 11 milliseconds, respectively.

Figure 4:
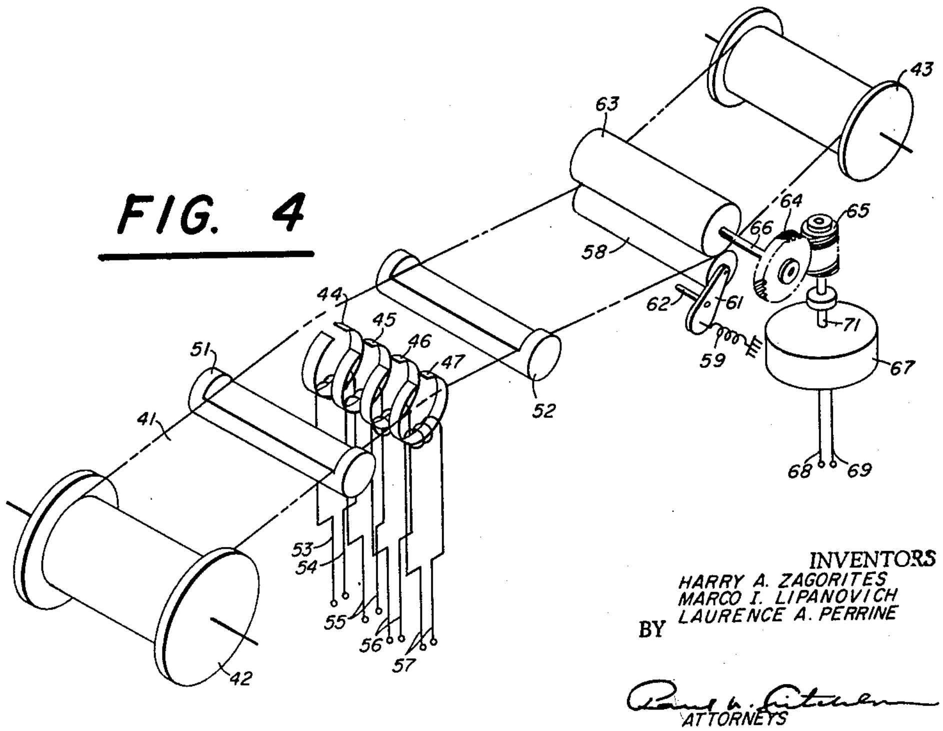
FIG. 4 is a pictorial diagram of tape transport apparatus suitable for use in the system shown in FIG. 1.

FIG. 4 illustrates pictorially magnetic tape apparatus in accordance with the system shown in FIG. 1. Magnetic tape 41 is fed from supply reel 42 and rewound on take-up reel 43. The tape is kept in alignment with recording heads 44–47 by means of tape guides 51 and 52. The coil leads 53 and 54 of recording head 44 are coupled to the output of timer 11. Leads 55 to 57 of heads 45–47 are coupled, respectively, to inputs 17–19 of Channels No. 2, No. 3 and "N." Arm 61 is pivotably fastened to fixed pin 62. Pressure roller 58 and spring 59 are fastened to the extremities of arm 61. Spring 59 which is under tension presses roller 58 against the oxide-coated side of magnetic tape 41 and keeps the tape squeezed between capstan 63 and pressure roller 58. A worm wheel 64 is fixed to the end of capstan shaft 66. Worm wheel 64 engages worm gear 65 which is fixed to the drive shaft 71 of stepping motor 67. A stepping motor is a device for delivering torque in discrete steps, on command. For a single command, it delivers the torque through a definite angle, at the limit of which the torque ceases unless a new command is given. A permanent magnet field within the motor may be used to arrest the rotation of the armature in the absence of a command or signal. A suitable stepping motor is the Cyclonome Stepping Motor manufactured by Sigma Instruments, Incorporated. Motor input leads 68 and 69 are connected to the output of power amplifier 23. Whenever an output signal from amplifier 23 appears on motor input leads 68 and 69, motor shaft 71 rotates through a definite angle causing worm gear 65 to rotate. Worm wheel 64 and capstan 63 are rotated when worm gear 65 moves. The capstan rotation pulls tape 41 past recording heads 44–47. The tooth ratio between wheel 64 and gear 65 and the diameter of capstan 63 are chosen to give the desired signal density on the tape. Signals on head leads 53–57 are recorded on tape 41 as they appear. Take-up spool 43 is rotated by mechanical drive means (not shown). The motor may be employed to drive the capstan 63 and take-up reel 43 simultaneously by coupling a slipping clutch to the take-up reel, placing a pulley on shaft 66 and intercoupling the clutch and pulley with a belt. The clutch, pulley and belt are not shown in the drawing. It is preferred that all of the recording heads be magnetically shielded with a shielding material (not shown) so as to isolate them from all magnetic fields produced by the motor. A suitable shielding material is Netic S–3–6, manufactured by the Perfection Mica Company, Chicago 22, Illinois.

Figure 5:
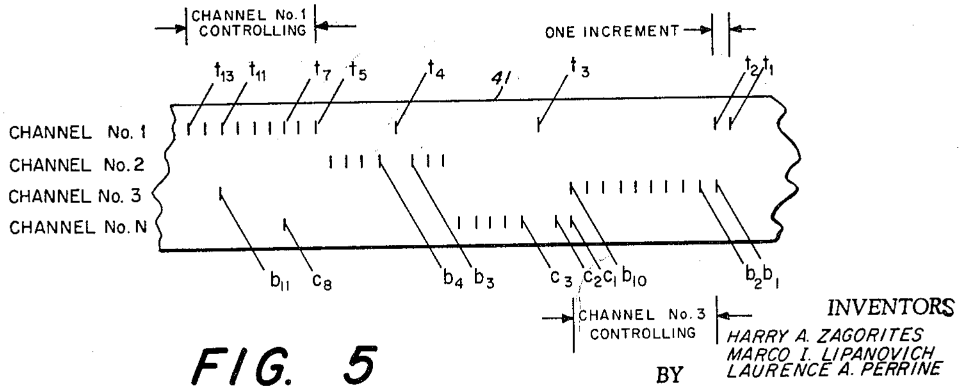
FIG. 5 is a diagrammatic representation of signals recorded incrementally on a specific recording medium.

FIG. 5 illustrates diagrammatically pulses recorded on magnetic tape 41. The pulses were recorded on the tape in a right-to-left direction. The first signal recorded on the tape was timing signal $t_1$ in Channel No. 1. At the same instant the timing signal $t_1$ was being recorded it caused the stepping motor to move or index the tape one step or increment of length. The tape was not advanced again until the second timing signal $t_2$ occurred. Signals $b_1$ and $t_2$ reached the recording heads 44 and 46 and OR gate 21 simultaneously and were thus both recorded at the same transverse position on the tape. As both signals reached the OR gate in coincidence, only one pulse was emitted at the output of the OR gate and that one pulse caused the stepping motor 67 to be moved only one increment. The tape was not advanced again until signal $b_2$ occurred. Looking across the entire section of the tape it is apparent that a number of pulses arrived at the recording heads and OR gate in coincidence. See signals $c_1$ and $b_{10}$, $c_8$ and $t_7$, and $b_{11}$ and $t_{11}$. Note that the tape was indexed only once when these coincident signals arrived. Timing signal $t_3$ arrived after signal $c_2$ and before $c_3$. As $t_3$ was not in coincidence with $c_2$, $t_3$ and $c_2$ each caused the tape to be indexed one increment. This produced a two-increment gap between $c_2$ and $c_3$. Timing signal $t_4$ was not in coincidence with signal $b_3$ or signal $b_4$ and similarly a two-gap increment exists $b_3$ and $b_4$. The repetition rate of the timing signals is constant. The spacing between adjacent timing signals varies because the repetition rate of the signals in the data channels is random. As the magnetic tape was indexed or moved in accordance with the rate at which timing signals and data signals were received, the channel having the highest repetition rate had predominate control of the rate of tape movement. Of course, when no data signals are received, the timing channel, Channel No. 1, controls the rate of tape movement and the rate is constant. The tape moved at a relatively high rate between $t_2$ and $t_3$. The rate decreased between $t_3$ and $t_4$ and dropped even more between $t_4$ and $t_5$. Between $t_5$ and $t_{13}$ the rate was constant and at a minimum.

Figure 6:
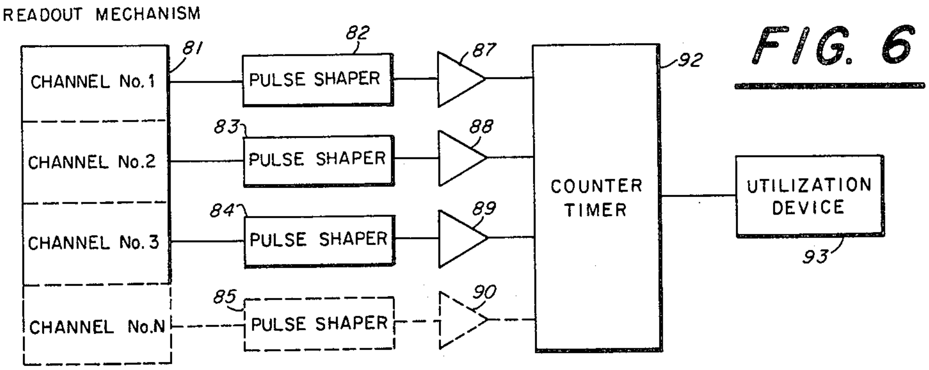
FIG. 6 is a block diagram illustrating read-out apparatus for reading a recording medium recorded by apparatus of FIG. 1.

FIG. 6 illustrates readout apparatus for reading a recording medium recorded by apparatus of FIG. 1. The apparatus of FIG. 6 is equipped with a readout mechanism 81 that reads or examines the channels of the recording medium in parallel fashion producing a pulse train for each channel having signals recorded thereon. The readout mechanism must be compatible with the recording medium. When the recording medium is magnetic tape as employed in the apparatus of FIG. 4, the readout mechanism 81 may be any constant speed magnetic tape playback device that employs in-line playback heads and will accommodate as many channels as have been recorded on the magnetic tape. The playback speed is not critical. For example, a tape player operating at a standard tape speed of 7½ inches per second may be employed. The output parallel pulse trains are shaped in pulse shapers 82–85, respectively, and then amplified in amplifiers 87–90, respectively. The amplified pulses are then fed into counter-timer 92 which is an events-per-unit-time counter that measures how many pulses occur per a predetermined time interval in each channel. The recorded timing signals may be employed to define the predetermined time interval. The output of the counter-timer 92 is fed into an utiliziation device 93 which may be an indicator which produces a visual presentation of the number of pulses or bits occurring per predetermined time interval in each channel. The utilization device may be, for example, a digital printer that has a multichannel capacity and types on paper the number of pulses occurring per predetermined time interval per channel. Counter-timers and digital printers of the type described above are well-known in the art and commercially available from a number of manufacturers such as Hewlett-Packard and Beckman Industries. Referring to FIG. 3 and assuming the predetermined interval is the time interval between timing signals, the printer would show the following output for the $t_2$ to $t_3$ interval: Channel No. 2, 0; Channel No. 3, 10; and Channel "N," 2. Similarly the output for the $t_3$ to $t_4$ interval would be: Channel No. 2, 3; Channel No. 3, 0; and Channel "N," 5.

It should be appreciated that for the example described the incremental recording and constant speed playback yields data identical to that achieved by constant speed recording and constant speed playback. The former technique, however, enables a compressed recording medium length, reduces readout time, and conserves input power to the drive mechanism.

Assume, for purposes of example only, the following specifications: incremental step, 0.005 inch; timing repetition rate, 1 pulse per second; and length of recording medium, 900 feet. If no data pulses entered the system the recording time would be 600 hours. With data pulses entering the system at a rate of 50 pulses per second the recording time would be 12 hours (disregarding the timing pulses).

Although specific recording medium translating apparatus is disclosed in FIG. 4 it should be understood that other apparatus may be employed for incrementally translating the recording medium. For example, the linear shaft motion of a solenoid may be translated to an incrementally stepped medium motion, by actuating the solenoid once for each input signal from any channel. The method of translating the solenoid shaft motion to medium motion may be: (*a*) by converting the linear shaft motion of the solenoid into a reciprocating motion and driving the medium by means of a hole-and-sprocket drive or a capstan-friction drive; (*b*) by arranging the solenoid to release the power of a spring through a clock-type escapement. The spring would provide rotary drive power for the medium when triggered by the solenoid; and by arranging the solenoid to drive a pivoted lever which pulls the recording medium from the supply source in steps.

A magnetic tape recording medium is disclosed in FIG. 4. It should be appreciated that other forms of magnetic media such as films, wires, discs and drums may be employed. Furthermore, other types of media such as the following may be employed: light sensitive films and papers; heat sensitive films and papers, punched tapes, cards and films; and electrostatic tapes, films, discs and drums.

Obviously many modifications and variations of the present invention are possible in the light of the above teachings. It is therefore to be understood that within the scope of the appended claims the invention may be practiced otherwise than as specifically described.

What is claimed is:

1. In a system for simultaneously recording timing data and $n$ channels of information data on a recording medium, means having an output for generating timing signals, n input terminals adapted to receive n information signals, respectively, a recording medium, $n+1$ writers for recording said signals on said recording medium, each of said writers having a signal input, said timer output and said input terminals being connected to said writers, respectively, an OR gate having $n+1$ inputs and an output, said timer output and said input terminals being connected to said OR gate inputs, respectively, means for indexing said recording medium with respect to said writers, indexing rate limiting means comprising an AND gate having first and second inputs and an output, an amplifier having an input and an output, means for coupling said output of said OR gate to said first input of said AND gate, said output of said AND gate being connected to said input of said amplifier, a monostable multivibrator having an input and an output, said multivibrator input being connected to said indexing means input and to said amplifier output, and said multivibrator output being connected to said second input of said AND gate.

2. In a system for recording $n+1$ channels of data on a recording medium with $n+1$ writers and having said recording mediums move with respect to said writers in accordance with the input rate of said data, means having an output for generating timing signals, n input terminals, said input terminals adapted to receive serial pulse signals, a recording medium having $n+1$ channels, $n+1$ writers for recording said signals on said recording medium, an OR gate having $n+1$ inputs and an output, said output of said timing signal generating means being connected to one of said inputs of said OR gate and to one of said writers, $n$ limiting means for limiting the rate of binary-coded signals to a maximum, each of said limiting means comprising an AND gate having first and second inputs and an output, means having an input and an output for generating an "0" pulse when said maximum rate is exceeded, means for coupling said input of said "0" pulse generating means for coupling said input of said "0" pulse generating means to said first input of said AND gate, means for coupling said output of said "0" pulse generating means to said second input of said AND gate, each of said first AND gate inputs being also connected to respective ones of said $n$ input terminals, each of said AND gate outputs being connected to the remainder of said OR gate inputs, respectively, and to the remainder of said writers, respectively, and means for moving said recording medium in incremental steps with respect to said writers, said moving means having an input, and means for coupling said output of said OR gate to said input of said moving means.

3. Apparatus in accordance with claim 2 wherein said means for coupling said output of said OR gate to said input of said moving means comprises means for limiting the number of signals reaching said indexing means from said OR gate in a fixed period of time.

4. Apparatus in accordance with claim 2 wherein said means for coupling said output of said OR gate to said input of said moving means comprises an And gate having first and second inputs and an output, an amplifier having an input and an output, said means for coupling said output of said OR gate to said first input of said And gate, said output of said And gate being connected to said input of said amplifier, a monostable switching circuit having an input and an output, said input of said multivibrator being connected to said input of said indexing means and to said output of said multivibrator being connected to said second input of said And gate.

References Cited by the Examiner

UNITED STATES PATENTS

| | | | |
|---|---|---|---|
| 2,814,676 | 11/57 | House | 340—174.1 |
| 2,972,736 | 2/61 | Hersh | 340—174.1 |

IRVING L. SRAGOW, *Primary Examiner.*

UNITED STATES PATENT OFFICE
CERTIFICATE OF CORRECTION

Patent No. 3,167,777 — January 26, 1965

Harry A. Zagorites et al.

It is hereby certified that error appears in the above numbered patent requiring correction and that the said Letters Patent should read as corrected below.

Column 6, line 60, for "binary-coded" read -- serial pulse --.

Signed and sealed this 21st day of December 1965.

(SEAL)
Attest:

ERNEST W. SWIDER
Attesting Officer

EDWARD J. BRENNER
Commissioner of Patents